June 12, 1923.

A. BRIGDEN 1,458,800

BOLL WEEVIL MACHINE

Filed Aug. 29, 1922

Arthur Brigden
INVENTOR

WITNESSES

BY

ATTORNEY

June 12, 1923.
A. BRIGDEN
BOLL WEEVIL MACHINE
Filed Aug. 29, 1922
1,458,800
2 Sheets-Sheet 2
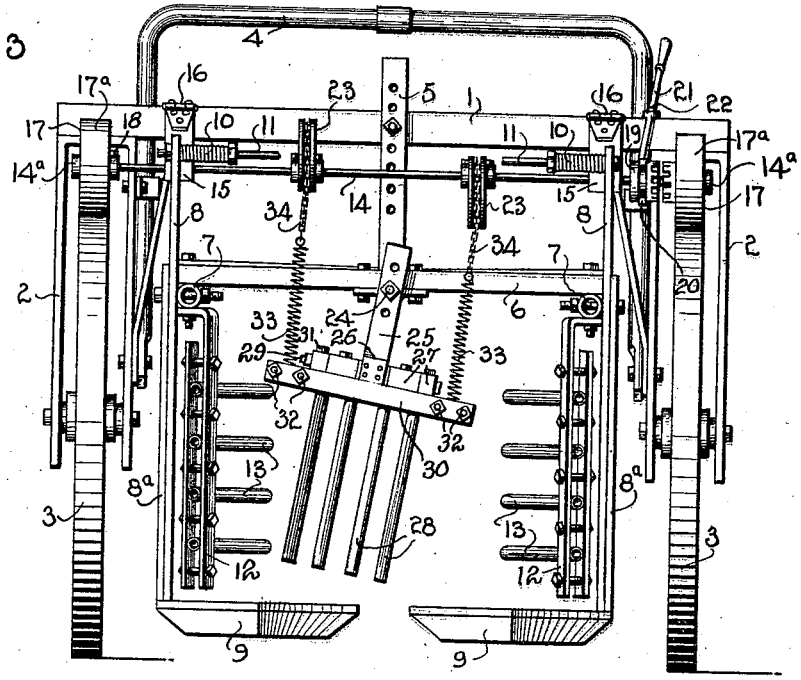
Fig. 3
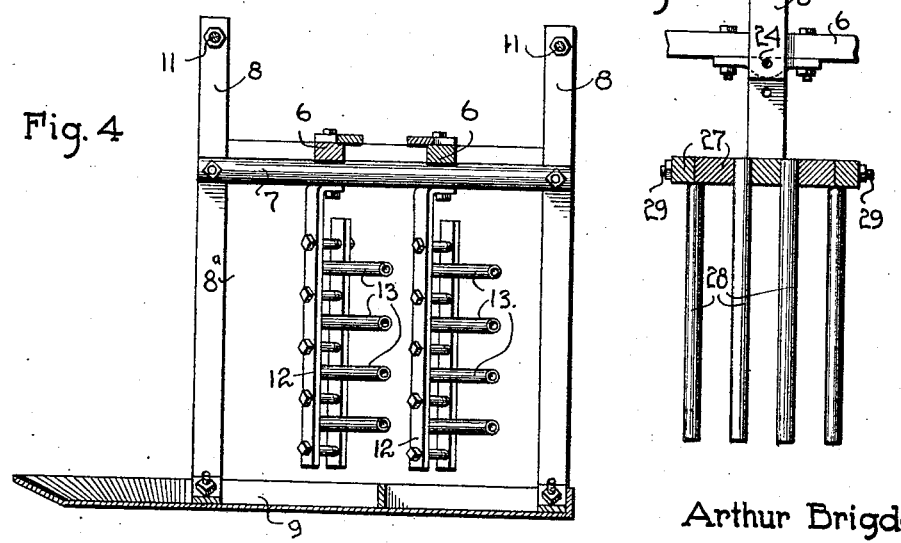
Fig. 4
Fig. 5
Arthur Brigden
INVENTOR
WITNESSES
BY
ATTORNEY

Patented June 12, 1923.

UNITED STATES PATENT OFFICE.

ARTHUR BRIGDEN, OF BIRMINGHAM, ALABAMA.

BOLL-WEEVIL MACHINE.

Application filed August 29, 1922. Serial No. 584,969.

*To all whom it may concern:*

Be it known that I, ARTHUR BRIGDEN, a citizen of the United States, residing at Birmingham, in the county of Jefferson and State of Alabama, have invented new and useful Improvements in Boll-Weevil Machines, of which the following is a specification.

This invention relates to improvements in boll weevil machines, and is designed especially for use in connection with and as an improvement on the machines disclosed in my co-pending applications for patents, filed February 14, 1922, Serial No. 536,601 and August 12, 1922, Serial No. 581,480.

The object of the present invention is to provide an attachment for use in connection with such machines to remove the boll weevils from small, young cotton plants, which are not high enough for treatment by the means shown in said applications, the said attachment embodying means for delivering a series of side-swiping blows to the young plants by transversely rocking elements, and to render such blows harmless to the plants by resilient means interposed between the frame carrying the flexible knocking fingers and the driving mechanism therefor.

Another object is to provide operating mechanism for the transverse agitator which will impart a regular, uniform movement to the same to remove the weevils from the plants and deposit them in the catching pans carried by the machine, said operating mechanism having means for throwing the same partially out of gear so as to permit the machine to turn corners without imparting undue friction or strain to said mechanism.

A full and complete understanding of the invention may be obtained from a consideration of the following detailed description, taken in connection with the accompanying drawings forming a part of this specification, it being understood that while the drawings show a practical form of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 3 is a front elevation thereof;

Figure 4 is a longitudinal sectional view of the supporting frame with parts removed;

Figure 5 is a detail sectional view of the transverse agitator; and

Figure 1:
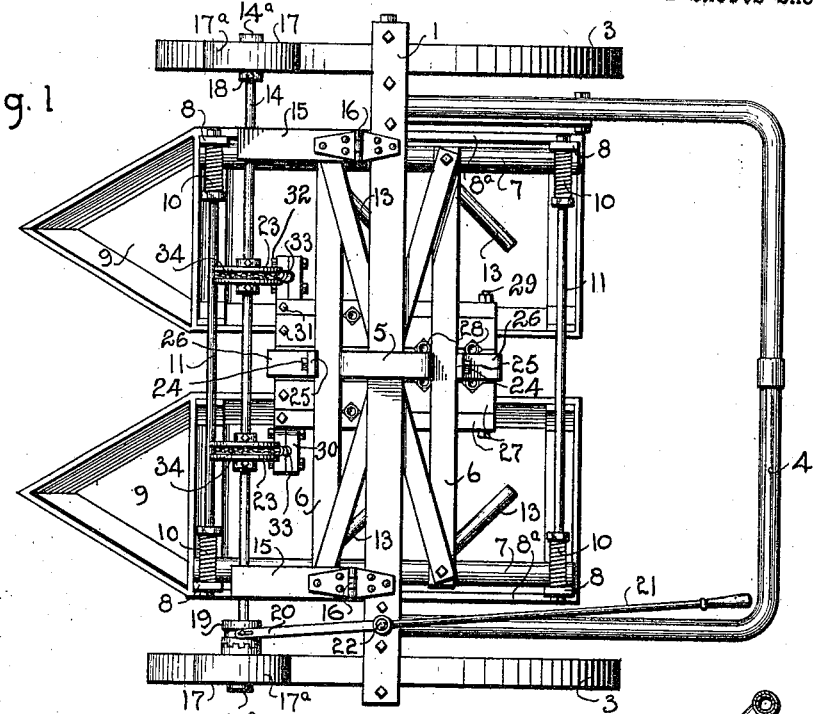
Figure 1 is a plan view of a boll weevil machine having the improved attachment applied thereto.

In the drawings there is illustrated a boll weevil machine constructed in accordance with the machine disclosed in the above mentioned earlier applications, and it is not deemed necessary to give any minute description of the same in the present application, as no claim is herein made thereto.

The said machine includes a transverse, main beam 1 having hangers 2 at each end, for the reception of ground wheels 3, mounted in any suitable manner and adapted to straddle a row of cotton plants, a handle 4 being attached to said hangers and extending to the rear, for the purpose of pushing and guiding the machine between the rows in a manner to avoid injury to the plants, as it is to be understood that said machine is adapted to be operated by hand.

Depending from the main beam 1, and at the center thereof, are adjustable hangers 5 which support, at their lower ends, spaced cross bars 6, terminating at either side of the machine, adjacent to the inner members of the hangers 2, where they are connected to longitudinally disposed pan-supporting members 7, preferably in the form of tubing, as shown, said members carrying, at their front and rear ends, vertically disposed bars 8 which, in turn, are secured at their lower ends to weevil catching pans 9, located close to the ground and spaced apart to travel along close to the stalks of the plants and beneath the foliage thereof, and having their front ends pointed to avoid contacting with said plants.

The upper ends of the vertical bars 8 which have side walls or panels 8ª attached thereto extend considerably above the supporting members 7 at each side of the machine, and the pair at one side are adapted to swing transversely of the machine independently of the pair at the other side of the machine, cushioning springs 10 being interposed between the same and mounted on transverse rods 11, so that the pans 9 may freely move outwardly against the pressure of the springs to automatically avoid injuring the plants, as is fully explained in the said earlier application.

The tubular members 7 carry spaced, depending hangers 12 at intermediate points between the vertical bars 8, and the said hangers 12 are provided with clamping means for supporting horizontal, flexible fingers 13, which extend inwardly toward the center line of the machine, where their free ends are adapted to come into contact with the plants and to knock off the weevils therefrom when the plant has become fully or nearly matured. When the plants are young, however, these fingers, which may be formed of coiled springs, rubber tubing or the like, or a combination of both, are adapted to be swung around out of the way, as indicated in Figures 1, 2, 3 and 4 of the drawings as they are elevated too high to contact with the small plants, and when this is done the attachment of the present application is brought into use for removing the weevils from the small plants.

The present invention comprises a shaft 14 extending transversely of the machine and in advance of the main beam 1, to which it is hingedly connected by means of forwardly-extending arms 15, having suitable bearings at their front ends for the shaft 14 to rotate in, and connected at their rear ends to hinges 16, which are secured to the beam 1 at points substantially above the outer edges of the pans 9, as clearly shown in Figure 1 of the drawings.

Figures 2, 6, 7:
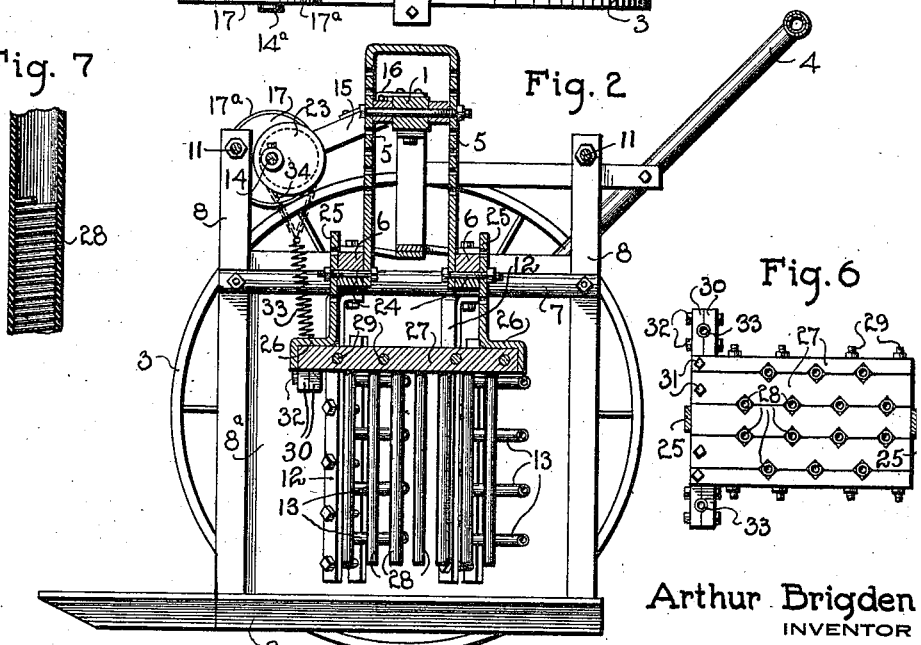
Figure 2 is a longitudinal sectional view of the same.
Figure 6 is a plan view of the transverse agitator.
Fig. 7 is a fragmentary sectional view of one of the flexible agitators.

The ends of the shaft 14, where extending beyond the arms 15, are provided with relatively small rollers 17, which are located in position to bear on the periphery of the ground wheels 3 when the arms 15 are in an inclined position, and the weight of the parts maintain the rollers in frictional engagement with the ground wheels to be rotated by the same when the machine is in motion, the peripheries of said rollers being provided with rubber or similar rims 17$^a$ to facilitate the same (Fig. 2).

One of the rollers, say the right hand one, is secured to the shaft by a set screw 18 or otherwise, while the other or left hand roller 17 is loosely mounted thereon, the same being held on the end of the shaft by a terminal flange or collar 14$^a$, and has its inner hub provided with teeth for coaction with corresponding teeth formed on the opposed face of a sliding collar 19, splined on the shaft 14, and provided with a circumferential groove for engagement by a yoke 20, carried at the front end of an actuating lever 21 extending to the rear and within easy reach of the hand of the operator, said lever being fulcrumed on the top of the main beam 1, as at 22. By moving the lever 21 in the proper direction, the coacting toothed members may be disengaged, so that the wheels 3 of the machine may properly turn a corner without causing uneven influence on the rollers resulting in strain and undue friction.

A pair of oppositely disposed, grooved, eccentric wheels 23 are secured to the shaft 14 in spaced relation to each other, and at intermediate points between the arms 15, as clearly shown in Figure 1, the centers of said wheels being arranged at diametrically opposite points relative to the shaft 14.

The cross bars 6 are pivotally connected to the lower ends of the hangers 5 by bolts 24, in order to allow the pans 9 to rise and fall independently of each other, and the bolts 24 serve to pivot adjustable hangers 25, located at the longitudinal center of the machine, said hangers 25 having their lower ends offset, as at 26, and adapted to be bolted or otherwise secured to the ends of a series of clamping bars 27, disposed longitudinally of the machine and having matching grooves or seats for the reception of the upper ends of resilient fingers 28, and adapted to clamp the same by means of horizontal transverse bolts 29. The fingers 28 are preferably composed of lengths of coiled spring encased in rubber tubing, so as to provide the maximum amount of resiliency, and to protect the plants when the fingers come into contact with the same in a manner to be described (Figure 7).

Transverse clamping bars 30 are carried by the front ends of the members 27, the front bar 30 being bolted to the underside of the same by bolts 31, the second clamping bar being bolted to the first, as at 32, and the two coacting bars having matching grooves or seats for the reception of the lower end portions of coiled springs 33, so that by loosening the bolts 32, the lower ends of the springs may be adjusted to lengthen or shorten the same.

The upper ends of the coiled springs 33 are connected to loops 34 formed of short lengths of chain, cable or the like, said loops 34 passing around the eccentric wheels 23 and fitting in the grooves thereof, so that, as the shaft 14 is rotated, said wheels rise and fall alternately. Thus, through the medium of the springs 33 and the loops 34 they impart a rocking movement to the members 27 in a direction transversely of the machine, and cause the depending fingers 28 to give a crosswise swiping action to the young plants, and to brush off all weevils and throw the same into the pans 9 immediately flanking the plants.

By the introduction of the eccentric wheels and the chain loops, together with the connected springs 33, a flexible or resilient driving action is imparted to the rocking members, which serves to prevent injuring the plants, as will be readily seen.

From the foregoing it will be seen that a simple, cheaply manufactured and easily installed attachment has been provided for boll weevil machines, which may be used for operating on young plants, after first moving the agitator fingers for grown plants out of the way, and that the lower ends of the resilient, rocking fingers 28 will serve to remove the insects from the young plants without damaging the same.

What is claimed is:—

1. An attachment for boll weevil machines, comprising a supporting frame, ground wheels, a transverse drive shaft, means for driving said shaft from the ground wheels, eccentric wheels on said drive shaft, a transversely rocking frame carried by the supporting frame and having depending fingers adapted to swing transversely across the plants, spaced weevil-catching pans at each side of the supporting frame, coiled springs connected to the rocking frame, and chains connected to said springs and to said eccentric wheels.

2. An attachment for boll weevil machines including spaced ground wheels carrying a supporting frame and having spaced weevil-catching pans, said attachment comprising a drive shaft arranged transversely of the machine, vertically swinging, longitudinal arms hinged to the frame and in which the ends of the drive shaft are mounted, rollers carried by the shaft and bearing on the ground wheels, one of said rollers being fixed to the shaft, the other being loose thereon and having a clutch face, a slidable clutch collar splined on the shaft and shiftable into engagement with the loose roller, a transversely rocking frame, and means for connecting said drive shaft to said rocking frame.

3. An attachment for boll weevil machines including spaced ground wheels carrying a supporting frame and having spaced weevil-catching pans, said attachment comprising a drive shaft arranged transversely of the machine, vertically swinging, longitudinal arms hinged to the frame and in which the ends of the drive shaft are mounted, rollers carried by the shaft and bearing on the ground wheels, spaced, oppositely disposed eccentric wheels mounted on the shaft, a transversely rocking frame carried by the machine frame and having adjustable, depending, resilient fingers adapted to swing transversely across small plants to remove the weevils and deposit the same in the pans, and resilient means connecting the rocking frame to the eccentric wheels.

4. An attachment for boll weevil machines, including spaced ground wheels carrying a supporting frame and having spaced weevil-catching pans, said attachment comprising a drive shaft arranged transversely of the machine, vertically swinging, longitudinal arms hinged to the frame and in which the ends of the drive shaft are mounted, rollers carried by the shaft and bearing on the ground wheels, one of said rollers being fixed to the shaft, the other being loose thereon and having a clutch face, a slidable clutch collar splined on the shaft and shiftable into engagement with the loose roller, spaced, oppositely-disposed eccentric wheels mounted on the shaft and provided with peripheral grooves, a transversely rocking frame carried by the machine frame and having adjustable, depending, resilient fingers adapted to swing transversely across small plants to remove the weevils and deposit the same in the pans, coiled springs adjustably connected to the front end of the rocking frame, and chain loops connected to the upper, free ends of said springs and surrounding the eccentric wheels, in the peripheral grooves thereof to resiliently impart movement to the rocking frame.

5. An attachment for boll weevil machines of the class described, comprising a drive shaft arranged transversely of the machine, rollers mounted on the ends of the shaft and adapted to bear on and to be rotated by the ground wheels of the machine, spaced grooved wheels keyed to the shaft between the supporting arms of the same, said wheels being eccentrically mounted at diametrically opposite points, longitudinally alined hangers pivoted at their upper ends to the machine frame, a series of longitudinally disposed clamping bars carried at the lower ends of the hangers to constitute a transversely rockable frame, a series of spaced, resilient fingers carried by the clamping bars and adjustable therein to deliver a side swipe to growing plants, coiled springs adjustably connected to the front ends of the clamping bars, and flexible loops connected to the upper free ends of said springs and traversing the peripheral grooves of the eccentric wheels to impart rocking movement to the fingers.

6. An attachment for boll weevil machines of the class described comprising a drive shaft arranged transversely of the machine, longitudinal arms hinged at their rear ends to the frame of the machine and having bearings for the shaft at their free forward ends, rollers mounted on the ends of the shaft and adapted to bear on and to be rotated by the ground wheels of the machine, spaced grooved wheels keyed to the shaft between the supporting arms of the same, said wheels being eccentrically mounted at diametrically opposite points, longitudinally alined hangers pivoted at their upper ends to the machine frame, a series of longitudinally disposed clamping bars carried at the lower ends of the hangers to constitute a transversely rockable frame, a series of spaced, resilient fingers carried by the clamping bars and adjustable therein to deliver a side swipe to growing plants, coiled springs adjustably connected to the front ends of the clamping bars, and flexible loops connected to the upper free ends of said springs and traversing the peripheral grooves of the eccentric wheels to impart rocking movement to the fingers.

7. An attachment for boll weevil machines of the class described comprising a drive shaft arranged transversely of the machine, means for mounting said shaft, spaced wheels mounted on the shaft, said wheels being eccentrically mounted at diametrically opposite points, longitudinally alined hangers pivoted at their upper ends to the machine frame, a series of longitudinally disposed clamping bars carried at the lower ends of the hangers to constitute a transversely rockable frame, a series of spaced, resilient fingers carried by the clamping bars and adjustable therein to deliver a side swipe to growing plants, coiled springs adjustably connected to the front ends of the clamping bars, and flexible loops connected to the upper free ends of said springs and traversing the peripheral grooves of the eccentric wheels to impart rocking movement to the fingers.

8. An attachment for boll weevil machines including spaced ground wheels carrying a supporting frame and having weevil catching pans, said attachment comprising a drive shaft arranged transversely of the machine, vertically swinging longitudinal arms hinged to the frame and in which the ends of the drive shaft are mounted, rollers in driving relation to said shaft and bearing on the ground wheels, a clutch between one of the rollers and said shaft, a frame mounted for transverse rocking movement, and means for connecting said drive shaft to said last-mentioned frame to rock the same.

In testimony, that I claim the foregoing as my own, I have hereto affixed my signature.

ARTHUR BRIGDEN.